(12) United States Patent
Delnick et al.

(10) Patent No.: US 11,145,885 B2
(45) Date of Patent: Oct. 12, 2021

(54) HIGH CAPACITY ORGANIC RADICAL MEDIATED PHOSPHOROUS ANODE FOR REDOX FLOW BATTERIES

(71) Applicant: UT-BATTELLE, LLC, Oak Ridge, TN (US)

(72) Inventors: Frank M. Delnick, Maryville, TN (US); Jagjit Nanda, Knoxville, TN (US); Ethan C. Self, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 97 days.

(21) Appl. No.: 16/519,613

(22) Filed: Jul. 23, 2019

(65) Prior Publication Data

US 2020/0028197 A1  Jan. 23, 2020

Related U.S. Application Data

(60) Provisional application No. 62/701,859, filed on Jul. 23, 2018.

(51) Int. Cl.
*H01M 8/18* (2006.01)
*H01M 8/0221* (2016.01)
(Continued)

(52) U.S. Cl.
CPC ......... *H01M 8/188* (2013.01); *H01M 4/8652* (2013.01); *H01M 4/9041* (2013.01); *H01M 8/0221* (2013.01)

(58) Field of Classification Search
CPC .................................................... H01M 8/188
See application file for complete search history.

(56) References Cited

U.S. PATENT DOCUMENTS 9,029,042 B2 * 5/2015 Creeth .................. H01M 8/188
429/479
9,548,509 B2   1/2017 Anderson et al.
(Continued)

OTHER PUBLICATIONS

Wang et al.: "Redox Targeting of Insulating Electrode Materials: A New Approach to High-Energy-Density Batteries", Angew. Chem, 118, 2006, p. 8377-8380.
(Continued)

*Primary Examiner* — Amanda C. Walke
(74) *Attorney, Agent, or Firm* — Fox Rothschild LLP

(57) ABSTRACT

A battery includes a redox flow anode chamber coupled to an anode current collector, a separator, and an external container in fluid connection with the redox flow anode chamber. The external container has therein a solid phosphorus material. A first redox-active mediator and the second redox-active mediator are circulated through the half-cell electrode chamber and the external container. During a charging cycle the first redox-active mediator is reduced at the current collector electrode and the reduced first mediator reduces the phosphorus material, and wherein during a discharging cycle the second redox-active mediator is oxidized at the anode current collector electrode, and the second redox-active mediator is then reduced by the reduced phosphorus material. A method of operating a battery and a method of making a battery are also discussed.

12 Claims, 11 Drawing Sheets

(51) Int. Cl.
H01M 4/90 (2006.01)
H01M 4/86 (2006.01)

(56) References Cited

U.S. PATENT DOCUMENTS

| | | | |
|---|---|---|---|
| 9,859,583 B2 | 1/2018 | Delnick et al. | |
| 10,547,077 B2* | 1/2020 | Nariyama | H01M 8/188 |
| 2011/0200848 A1* | 8/2011 | Chiang | H01M 8/20 429/4 |
| 2011/0274948 A1* | 11/2011 | Duduta | H01M 10/052 429/50 |
| 2014/0050947 A1* | 2/2014 | Donnelly | H01M 8/20 429/7 |
| 2014/0178735 A1* | 6/2014 | Wang | H01M 8/20 429/105 |
| 2015/0255803 A1* | 9/2015 | Delnick | H01M 4/9041 429/498 |
| 2015/0280259 A1* | 10/2015 | Anderson | H01M 8/188 429/409 |
| 2017/0222226 A1* | 8/2017 | Helms | H01M 4/382 |
| 2019/0027738 A1* | 1/2019 | Ocampo | H01G 11/38 |
| 2019/0103600 A1* | 4/2019 | Greer | H01M 4/8875 |

OTHER PUBLICATIONS

Huang et al.: "Reversible chemical delithiation/lithiation of LiFePO4: towards a redox flow lithium ion battery", Phys. Chem., 15, 2013, p. 1793-1797.
Pan et al.: "Redox Targeting of Anatase TiO 2 for Redox Flow Lithium-Ion Batteries", Adv. Energy Mater., 4, 2014.
Jennings et al.: "Kinetics of LixFePO4 Lithiation/Delithiation by Ferrocene-Based Redox Mediators: An Electrochemical Approach", J. Phys. Chem. C, 119(31), 2015, p. 17522-17528.
Jia et al.: "High-energy density nonaqueous all redox flow lithium battery enabled with a polymeric membrane", Sci. Adv., 2015, p. 1-7.
Zhu et al.: "Redox-Mediated ORR and OER Reactions: Redox Flow Lithium Oxygen Batteries Enabled with a Pair of Soluble Redox Catalysts", ACS Catal., 2016, 6, p. 6191-6197.
Huang et al.: "Redox-assisted Li+-storage in lithium-ion batteries", Chin. Phys. B, vol. 25, No. 1, 2016, p. 018213(1)-018213(7).
Fan et al.: "Redox Targeting of Prussian Blue: Toward Low-Cost and High Energy Density Redox Flow Battery and Solar Rechargeable Battery", ACS Energy Lett., 2017, p. 615-621.
Zhu et al.: "Unleashing the Power and Energy of LiFePO4-Based Redox Flow Lithium Battery with a Bifunctional Redox Mediator", Chem. Soc. 2017, 139, p. 6286-6289.
Zou et al.: "Nernstian-Potential-Driven Redox-Targeting Reactions of Battery Materials", Chem, 312/14/2017, p. 1036-1049.
Yu et al.: "Redox Targeting-Based Aqueous Redox Flow Lithium Battery", ACS Energy Lett., 3, 2018, p. 2314-2320.
Yan et al.: "Redox-Targeting-Based Flow Batteries for Large-Scale Energy Storage", Adv. Mater., 30, 2018.
Li et al.: "The Application of Redox Targeting Principles to the Design of Rechargeable Li-S Flow Batteries", Adv. Energy Mater., 5, 2015, p. 1501808(1)-1501808(6).
Pan et al.: "High-Energy Density Redox Flow Lithium Battery with Unprecedented Voltage Efficiency", Chem. Mater., 28, 2016, p. 2052-2057.
Huang et al.: "A redox flow lithium battery based on the redox targeting reactions between LiFePO4 and iodide", Energy Environ. Sci., 9, 2016, p. 917-921.
Zhang et al.: "Redox-targeted catalysis for vanadium redox-flow batteries", Nano Energy, 52, 2018, 292-299.
Park et al.: "Material design and engineering of next-generation flow-battery technologies", Nature Reviews Materials, vol. 2, 2016, p. 16080(1)-16080(18).
Qi et al.: "Review Article: Flow battery systems with solid electroactive materials", Journal of Vacuum Science & technology B, 35, 2017.
Zanzola et al.: "Redox Solid Energy Boosters for Flow Batteries: Polyaniline as a Case Study", Electrochimica Acta 235, 2017, p. 664-671.
Frischmann et al.: "Supramolecular Perylene Bisimide-Polysulfide Gel Networks as Nanostructured Redox Mediators in Dissolved Polysulfide Lithium?Sulfur Batteries", Chem. Mater., 27, 2015, p. 6765-6770.
Wang et al.: "Exploring polycyclic aromatic hydrocarbons as an anolyte for nonaqueous redox flow batteries", Mater. Chem. A, 6, 2018, p. 13286-13293.
Huang et al.: "The lightest organic radical cation for charge storage in redox flow batteries", Scientific Reports, 2016, p. 1-9.
Yu et al.: "A class of liquid anode for rechargeable batteries with ultralong cycle life", Nature Communications, 2017, p. 1-7.
Holy, "Reactions of the Radical Anions and Dianions of Aromatic Hydrocarbons", Chem. Rev., 74(2), 1974, p. 243-277.
Pan et al.: "Biphenyl-lithium-TEGDME solution as anolyte for high energy density non-aqueous redox flow lithium battery", Journal of Energy Chemistry, 27, 2018, p. 1362-1368.
Qian et al.:, "High Capacity and Rate Capability of Amorphous Phosphorus for Sodium Ion Batteries", Angew. Chem. Int. Ed., 52, 2013, p. 1-5.
Chang et al., "Solution Synthesis of Iodine-Doped Red Phosphorous Nanoparticlesfor Lithium-Ion Battery Anodes", Nano Lett. 17, 2007, p. 1240-1247.
Sun et al., "Carbothermic reduction synthesis of red phosphorous-filled 3D carbon material as a high-capacity anode for sodium ion batteries", Energy Storage Materials, 4, 2016, p. 130-136.
Dunn et al., "Electric Energy Storage for the Grid: A Battery of Choices", Science, 334, 2011, p. 928-935.
Luo et al., "Capacity Decay and Remediation of Nafion-based All-Vanadium Redox Flow Batteries", ChemSusChem., 6(2), 2013, p. 268-274.
Chen et al., "Composite blend polymer membranes with increased proton selectivity and lifetime for vanadium redox flow batteries", J. Power Sources, 231(6), 2013, p. 301-306.
Vijayakumar et al., "Elucidating the higher stability of vanadium(V) cations in mixed acid based redox flow battery electrolytes", J. Power Sources, 241(11), 2013, p. 173-177.
Wei et al., "Nanoporous Polytetrafluoroethylene/Silica Composite Seperator as a High-Performance All-Vanadium Redox Flow Battery Membrane", Adv. Energy Mater., 9, 2013, p. 1215-1220.
Aaron et al.: "Dramatic performance gains in vanadium redox flow batteries throguh modified cell architecture", J. Power Sources, 206 (2012), p. 450-453.
Liu et al, "High Performance Vanadium Redox Flow Batteries with Optimized Electrode Configuration and Membrane Selection", Electrochem. Soc., 159 (2012), p. 1246-1252.
Sun et al., "Probing Electrode Losses in All-Vanadium Redox Flow Batteries with Impendance Spectroscopy", ECS Electrochem. Lett, 2 (2013), p. 43-45.
Sun et al., "Hydrogen evolution at the negative electrode of the all-vanadium redox flow batteries", J. Power Sources, 248 (2014), p. 560-564.
Sun et al., "Resolving Losses at the Negative Electrode in All-Vanadium Redox Flow Batteries Using Electrochemical Impedance Spectroscopy", J. Electrochem. Soc. , 161(6) (2014), p. 981-988.
Huskinson et al., "A metal-free organic-inorganic aqueous flow battery", Nature, 505 (2014), p. 195-209.
Brushett et al., "An All-Organic Non-aqueous Lithium-ion Redox Flow Battery" Adv. Energy Mater., 2(2012), p. 1390-1396.
Li et al., Electrochem. Solid State Lett., 14(12) (2011), p. 171.
Duduta et al., "Semi-Solid Lithium Rechargeable Flow Battery", Adv. Energy Mater., 1 (2011), p. 511-516.
Wang et al., "Li-Redox Flow Batteries Based on Hybrid Electrolytes: At the Cross Road between Li-ion and Redox Flow Batteries", Adv. Energy Mater., 2(2012), p. 770-779.
Wei et al., "TEMPO-Based Catholyte for High-Energy Density Nonaqueous Redox Flow Batteries", Adv. Mater., 26 (2014), p. 7649-7653.

(56) References Cited

OTHER PUBLICATIONS

Yang et al., "A membrane-free lithium/polysulfide semi-liquid battery for large scale energy storage", Energy Environ. Sci, 6 (2013)m p. 1552-1558.

* cited by examiner

HIGH CAPACITY ORGANIC RADICAL MEDIATED PHOSPHOROUS ANODE FOR REDOX FLOW BATTERIES

CROSS-REFERENCE TO RELATED APPLICATIONS

This application claims priority to U.S. Provisional application No. 62/701,859 filed on Jul. 23, 2018, entitled "PROCESS FOR ENERGY STORAGE IN A MEDIATED REDOX FLOW CELL", the entire disclosure of which incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention is related to flow batteries, and more particularly to mediated flow batteries.

BACKGROUND OF THE INVENTION

A battery's energy density is proportional to its capacity and operating voltage. Therefore, high energy batteries utilize high capacity anode materials which are oxidized and reduced at very negative potentials. Today's high energy batteries contain anodes comprised of either alkali metals, alkali metal alloys or lithium intercalation compounds, such as carbons and metal oxides. Of these materials, the alkali metals and alkali metal alloys exhibit the highest capacities, however, they also experience large volume change (>300%) during charge/discharge. These volume changes create: (i) discontinuities in the anode, such as pulverization of the active material, which limits cycle life, and (ii) and safety concerns when pressure is exerted across the cell separator. Furthermore, high energy anodes typically operate outside of the thermodynamic window of their respective electrolytes and only function through the formation of an ionically conductive passive film. Although essential for battery operation, these passive films limit charge/discharge rates and contribute to irreversible capacity losses in the cells which ultimately limits cycle life. These irreversible losses are further accelerated on anodes which experience large volume changes during battery operation. Therefore, a new process is needed to effectively utilize these high capacity anode materials.

The fundamental charge storage mechanisms in a number of currently studied high energy redox couples are based on intercalation, conversion, or displacement reactions, With exception to certain metal-air chemistries, most often the active redox materials are stored physically in the electrochemical cell stack thereby lowering the practical gravimetric and volumetric energy density as a tradeoff to achieve reasonable power density.

To enable the widespread adoption of renewable energy technologies, an electrical grid capable of storing intermittent energy sources such as solar and wind, must be developed. Redox flow batteries (RFBs) are promising energy storage devices for grid-level applications due to their extraordinarily long cycle life, resulting from the use of highly reversible redox couples, and the ability to independently scale their energy and power densities. A redox flow battery is a kind of battery where at least on one of the cathode and anode sides of the battery chemical energy is provided by a chemical component dissolved in a liquid and separated from the other electrode side by an ion exchange membrane. Ion exchange occurs across the membrane when the liquid circulates.

The energy density of a conventional RFB is dictated by its capacity, which is directly related to the solubility of the redox species in the electrolyte, and operating potential. Numerous RFB chemistries utilizing both aqueous and non-aqueous electrolytes have been explored. In general, aqueous systems have low operating potentials, such as 1.5 V, resulting in poor energy densities, for example 25-30 Wh/kg for an all-vanadium RFB. In comparison, the use of organic electrolytes with wider electrochemical windows moderately increases the energy density, but these devices are still ultimately limited by the solubility of the redox species in the electrolyte. To circumvent the solubility issue at the anode, some have investigated the use of Li metal anodes in a flow battery configuration. Despite their high energy densities, Li metal anodes present safety concerns due to dendrite formation and irreversible capacity losses caused by anode passivation. A promising yet largely unexplored approach for flow batteries utilizes electrochemically mediated reaction(s) to charge and/or discharge an active material.

There is shown in Table 1 performance data for mediated redox flow battery systems reported in the scientific literature.

TABLE 1

Performance summary of mediated redox flow batteries.

| Cell | Mediator Concentration (mM) | Solid Material Cycled Capacity (mAh g$^{-1}$) | Solid Material Utilization (%) | Cycle No. | Coulombic Efficiency (%) | Current Density (µA cm$^{-2}$) |
|---|---|---|---|---|---|---|
| Non-Aqueous Systems | | | | | | |
| $TiO_2$/$LiFePO_4$ | 5 | 58 | 36 | 47 | 90 | 50-87 |
| Li/$LiFePO_4$ | 20 | 112 | 70 | 2 | 97 | 310 |
| Li/$LiFePO_4$ | 25 | 117 | 73 | 45 | 98 | 125-500 |
| Li/$TiO_2$ | 5 | 55 | 33 | 50 | 90-95 | 25 |
| Li/$TiO_2$ | 5 | 110 | 66 | 1 | 90 | 100 |
| Li/$Fe_4[Fe(CN)_6]_3$ | 15 | 53 | 42 | 30 | 90 | 50 |
| Li/S | 10 | 134 | 8 | 100 | 99.5 | 320 |

TABLE 1-continued

Performance summary of mediated redox flow batteries.

| Cell | Mediator Concentration (mM) | Solid Material Cycled Capacity (mAh g$^{-1}$) | Solid Material Utilization (%) | Cycle No. | Coulombic Efficiency (%) | Current Density (μA cm$^{-2}$) |
|---|---|---|---|---|---|---|
| Li/O$_2$ | 10 | N/A | N/A | 35 | — | 100 |
| Li/LiFePO$_4$ | 500 | 152 | 95 | 5 | 90 | 25 |
| Li/LiFePO$_4$ | 10 | 60 | 38 | 40 | >99 | 25 |
| Aqueous Systems | | | | | | |
| LiTi$_2$(PO$_4$)$_3$/LiFePO$_4$ | 300 | 128 | 80 | 55 | 99 | 500 |
| poly(aniline)/carbon half cell | — | 46 | 32 | 25 | 97 | 38,500 |

Only two of these are full redox flow cells (TiO$_2$/LiFePO$_4$ and LiTi$_2$(PO$_4$)$_3$/LiFePO$_4$). The remainder are mediated (redox target) battery reactions conducted in half-cell configuration, typically with lithium counter electrodes (hybrid redox flow configuration). Mediated redox flow battery technology is in the early stages of development, and most of the technology is far from optimized.

Other types of redox flow systems are being investigated. Some of these are summarized in Table 2 below:

TABLE 2

| Redox Flow Systems | Solvent/ Electrolyte | Estimated Energy Density | Limitations |
|---|---|---|---|
| Vanadium based | Aqueous/acid, proton conducting membranes | 25-30 Wh/Kg | Low energy density, high acid concentration, toxic |
| Quinone-HBr/Br$_2$ | Aqueous, proton conducting membranes | ~30-35 Wh/Kg | Low energy density, toxic |
| Slurry based flow | Non-aqueous | ~100 Wh/Kg | Rheology control, low power density, cost |
| Lithium-metal/ aqueous redox flow cathode | Mixed solvents/Solid electrolyte separator | ~150 Wh/Kg | Lithium metal passivation, dendrites, safety issues |
| Lithium metal/organic cathode | Non-aqueous | ~200 Wh/Kg | Lithium metal passivation, dendrites, safety issues, requires new membrane |

In one general embodiment, a mediated redox flow battery can include a series of secondary organic molecules that form highly reduced anion radicals as reaction mediator pairs for the reduction and oxidation of primary high capacity redox species ex situ from the electrochemical cell stack. Arenes are reduced to stable anion radicals that in turn reduce a primary anode to the charged state. The primary anode is then discharged using a second arene which operates at a more positive potential. There is shown in U.S. Pat. No. 9,859,583 (Jan. 2, 2018) "Polyarene Mediators for Mediated Redox Flow Battery" a type of redox flow battery with examples of such organic mediators. The disclosure of this reference is hereby incorporated fully by reference. There is a continuing need for redox flow battery systems which have high capacity and cycle life.

SUMMARY OF THE INVENTION

A battery according to the invention can include a redox flow anode chamber coupled to an anode current collector electrode. A separator conducts one selected from the group consisting of lithium ions and sodium ions, and is coupled to the anode chamber. The anode chamber includes a first redox-active mediator and a second redox-active mediator.

An external container is in fluid connection with the redox flow anode chamber. The external container has therein a solid phosphorus material. The first redox-active mediator and the second redox-active mediator are circulated through the half-cell electrode chamber and the external container.

The phosphorus material has an average redox potential between the redox potential of the first mediator and the redox potential of the second mediator. During a charging cycle the first redox-active mediator is reduced at the current collector and subsequently reduces the phosphorus material. During a discharging cycle the second mediator is oxidized at the current collector, and the second redox-active mediator is then reduced by the reduced phosphorus material.

A method of operating a battery includes the step of providing a redox flow anode chamber coupled to an anode current collector, and providing a separator conducting one selected from the group consisting of Li+ and Na+, and coupled to the anode chamber, wherein the chamber comprises a first redox-active mediator and a second redox-active mediator.

The first redox-active mediator and the second redox-active mediator are circulated through the anode half-cell electrode chamber into an external container, wherein the external container contains therein a solid phosphorus material, wherein the phosphorus material has an average redox potential between the redox potential of the first mediator and the redox potential of the second mediator. During a charging cycle, the first redox-active mediator is reduced at the current collector electrode and the reduced first redox-active mediator is used to reduce the phosphorus material in the external container. During a discharge cycle, the reduced second mediator is oxidized at the current collector anode, and then the second redox-active mediator is reduced with the reduced phosphorus material in the external container.

A method of making a battery includes the steps of coupling a redox flow anode chamber to an anode current collector, coupling to the anode half-cell electrode chamber a separator conducting at least one selected from the group consisting of Li+ and Na+, and coupling to the anode chamber an external chamber comprising a solid phosphorus material. A solvent is placed into the redox flow half-cell electrode chamber. The solvent contains a first redox-active mediator and a second redox active mediator, wherein the phosphorus material has an average redox potential between the redox potential of the first mediator and the redox potential of the second mediator, and the first redox-active mediator and the second redox-active mediator are selected for a redox voltage spread and operating voltage of the anode half-cell electrode chamber. A cathode is coupled to the redox flow anode current collector electrode and to the separator.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1A:
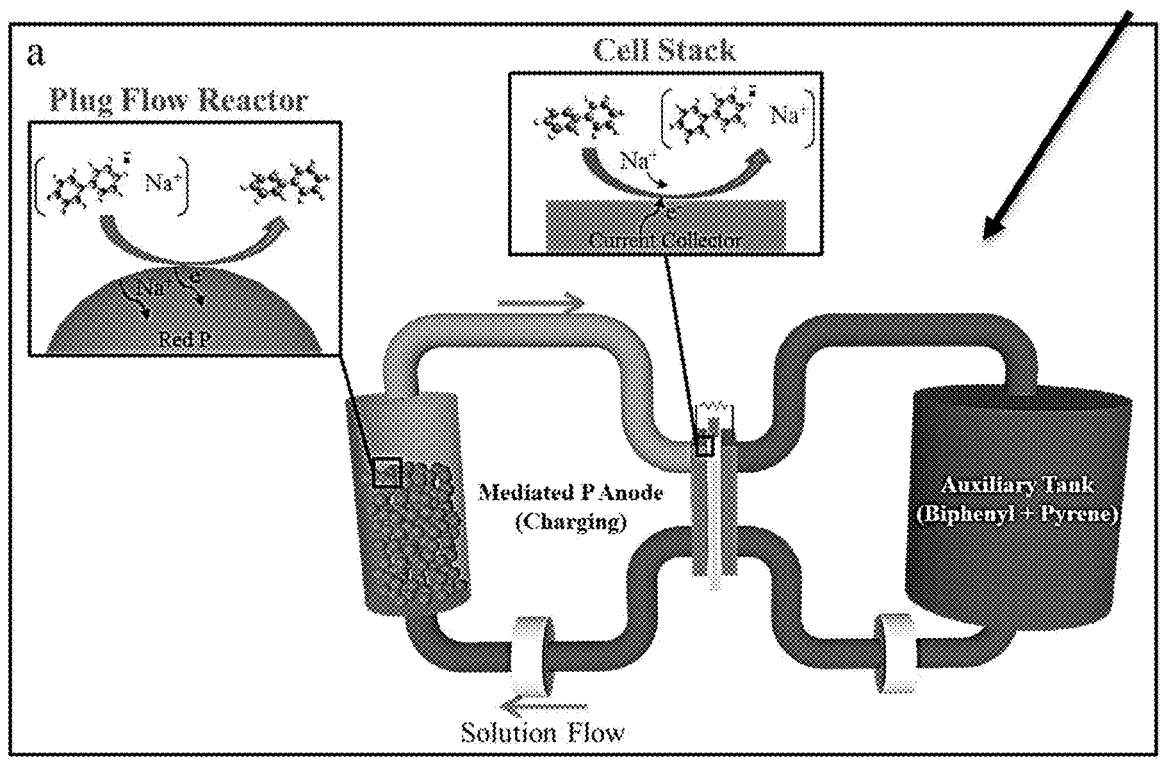
FIG. 1A is a schematic diagram of a redox flow battery according to the invention.

A battery includes a redox flow anode half-cell electrode chamber coupled to an anode current collector. A separator conducts one selected from the group consisting of lithium ions and sodium ions, and is coupled to the anode chamber. The anode chamber includes two soluble redox-active mediators. An external container is in fluid connection with the redox flow anode chamber. The external container has therein a solid phosphorus (P) material. The first redox-active mediator and the second redox-active mediator are circulated through the anode chamber and the external container.

The phosphorus material has an average redox potential between the redox potential of the first redox-active mediator and the redox potential of the second redox-active mediator. During a charging cycle, the first redox-active mediator is reduced at the anode current collector, and the reduced first mediator subsequently reduces the phosphorus material. During a discharging cycle, the second redox-active mediator is oxidized at the anode current collector, and the second redox-active mediator is then reduced by the reduced phosphorus material.

The phosphorus can be provided in different forms. The phosphorus can be provided as powders or pellets. The phosphorus can be secured to a porous support, such as a mesh, which allows liquid to flow there through while permitting good contact between the phosphorus and the mediators.

The first redox-active mediator can be an arene comprising at least one selected from the group consisting of a polyaromatic hydrocarbon, biphenyl, or a substituted derivative of either thereof. Other first redox-active mediators are possible.

The second redox-active mediator can be a second arene. The second arene can be a polyaromatic hydrocarbon, biphenyl, or a substituted derivative of either thereof, with the proviso that the second redox-active mediator is not the same as the first redox-active mediator. Other second redox-active mediators are possible.

The first or second arene can be biphenyl or a substituted derivative thereof. The first, second, or first and second redox-active mediator can be an arene that is substituted, and includes one or more substituent groups, R, wherein each R is independently selected from a linear, branched, cyclic, or aromatic alkyl group having 1-50 carbon atoms, optionally functionalized with a functional group including O, S, or N. The second arene can be at least one selected from the group consisting of: biphenyl, methylnaphthalene, naphthalene, acenaphthalyne, pyrene, anthracene, coronene, perylene, tetracene, fluorene, azulene, and chrysene, and substituted derivatives of any thereof, with the proviso that the second arene is not the same as the first arene. The first redox-active mediator can be biphenyl and the second redox-active mediator can be pyrene (sometimes hereafter denoted as "µ" and "π", respectively).

The external container can have different configurations. In one embodiment, the external container can have a flow reactor configuration, with a liquid inlet and outlet. Liquid electrolyte including the first and second mediators flows from the anode chamber to the liquid inlet, and flows through the external container to contact the phosphorus. Liquid flows from the liquid outlet back to the anode chamber.

A cathode is provided and can be any suitable cathode. In one embodiment, the cathode can include a cathode chamber coupled to a current collector comprising an active cathode material. Other cathode designs are possible.

The first redox-active mediator and the second redox-active mediator can be dissolved in a non-aqueous solvent. Many different solvents are possible. The solvent can be at least one selected from the group consisting of: tetrahydrofuran, dimethoxyethane, diglyme, triglyme, tetraethyleneglycol dimethylether, and mixtures thereof.

The concentration of the first redox-active mediator and the second redox-active mediator can vary. The concentration of the first redox-active mediator in the solvent is from 0.1 to 2 molar. The concentration of the second redox-active mediator in the solvent can vary from 0.1 to 2 molar. The concentration of either the first or second redox-active mediator can be 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0, or can with within a range of any high value and low value selected from these values.

A method of operating a battery can include the step of providing a redox flow anode chamber coupled to a current collector. A separator conducting at least one selected from the group consisting of Li$^+$ and Na$^+$ is positioned between the anode and a cathode, and coupled to the anode chamber.

The anode chamber contains a first redox-active mediator and a second redox-active mediator.

The first redox-active mediator and the second redox-active mediator are circulated through the anode chamber into an external container having a solid phosphorus material therein. The phosphorus material has an average redox potential between the redox potential of the first redox-active mediator and the redox potential of the second redox-active mediator.

During a charging cycle, the first redox-active mediator is reduced at the current collector, and the reduced first redox-active mediator is used to reduce the phosphorus material in the external container. During a discharge cycle, the reduced second mediator is oxidized at the current collector anode and then reduced by the reduced phosphorus material in the external container.

The capacity of the mediated reaction can be from 100 to 1900 mAH/g. The capacity of the mediated reaction can be 100, 150, 200, 250, 300, 350, 400, 450, 500, 550, 600, 50, 700, 750, 800, 850, 900, 90, 1000, 1050, 1100, 1150, 1200, 1250, 1300, 1350, 1400, 1450, 1500, 1550, 1600, 1650, 1700, 1750, 1800, 1850, and 1900 mAHr/g, or within a range of any high value and low value selected from these values.

A battery according to the invention can be made by any suitable process. In one embodiment, the battery can be made by coupling a redox flow anode chamber to an anode current collector. A separator conducting at least one selected from the group consisting of $Li^+$ and $Na^+$ is coupled to the anode chamber. An external chamber comprising a solid phosphorus material is coupled to the anode chamber. A solvent containing a first redox-active mediator and a second redox active mediator is placed into the redox flow chamber. The phosphorus material has an average redox potential between the redox potential of the first mediator and the redox potential of the second mediator. The first redox-active mediator and the second redox-active mediator can be selected for a desired redox voltage spread and operating voltage of the anode chamber. A cathode is coupled to the redox flow anode and to the separator.

The invention uses mediated electrochemical reactions such as with arene anion radical redox species (biphenyl and pyrene, denoted as ß and π, respectively) to utilize a high capacity P anode in a redox flow configuration. A battery 10 according to the invention is illustrated schematically in FIG. 1A. The anion radicals are transferred to a flow reactor containing red P powder which is sodiated/desodiated through mediated electrochemical reactions. During charge, a biphenyl anion radical pair (Na+ß.−) reduces red P powder to $Na_{x+y}P$, producing the neutral biphenyl species (ß$_0$) which is recycled back to the cell stack where the anion radical pair is regenerated. This process continues until the P powder is fully sodiated. To discharge the $Na_{x+y}P$ powder, a second arene (pyrene, π) is included in the anode electrolyte. Pyrene oxidizes the $Na_{x+y}P$ to $Na_yP$ (0<y<3), yielding the solvated ion pair $Na^+\pi.^-$ which is subsequently oxidized to the parent pyrene (π$_0$) in the cell stack. The overall charge and discharge reactions are illustrated in FIGS. 1B and 1C, respectively.

Figure 1B:
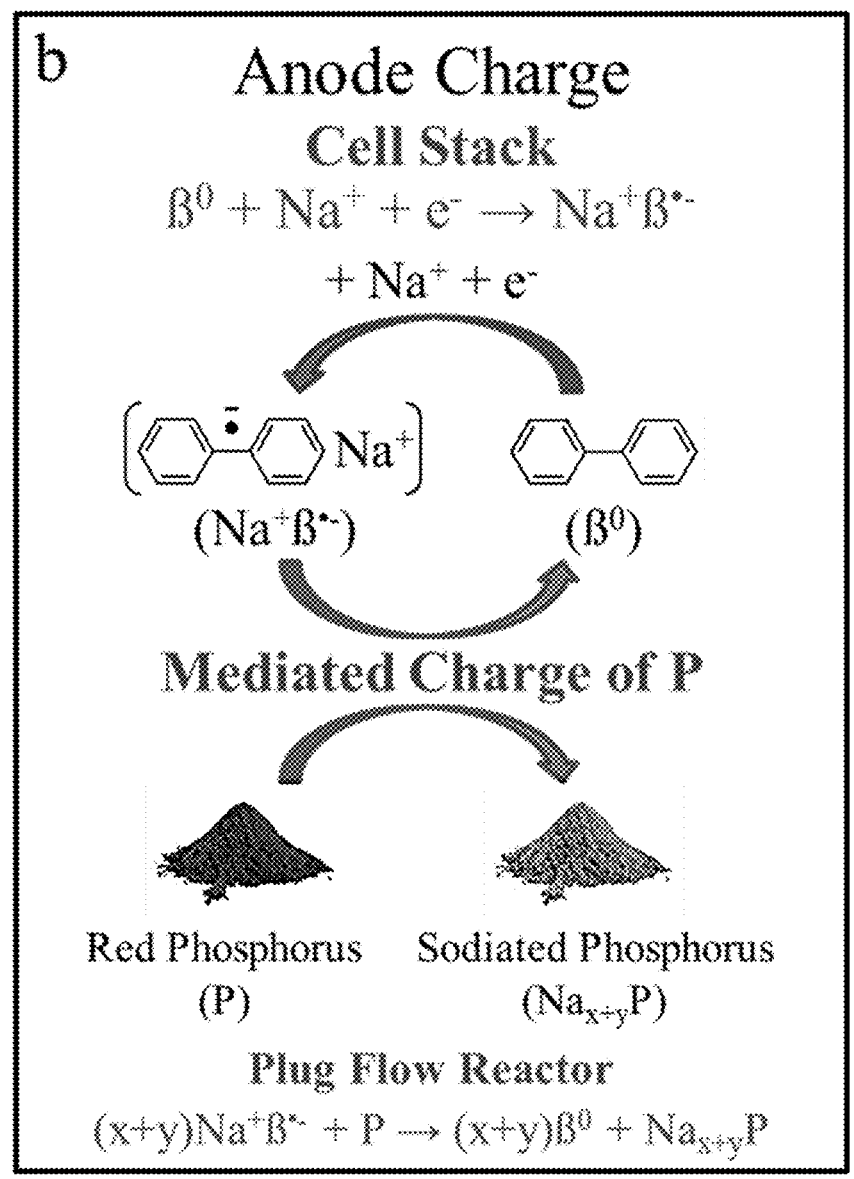
FIG. 1B is a schematic depiction of a mediated charge reaction for phosphorus in the flow reactor.
Figure 1C:
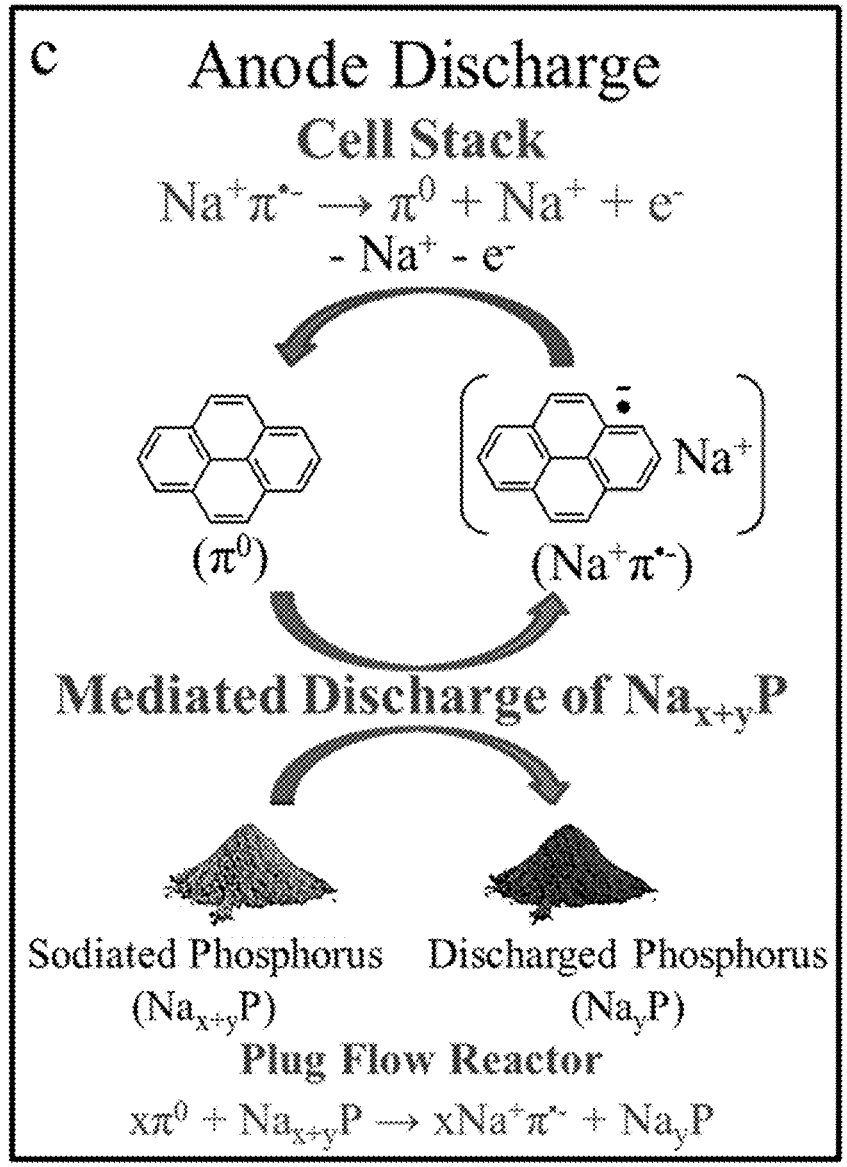
FIG. 1C is a schematic depiction of a mediated discharge reaction of $Na_{x+y}$ P in a redox flow reactor.

FIG. 1A is a schematic illustration showing reversible Na storage in a red P anode using biphenyl and pyrene mediators (denoted ß and π, respectively). The mediated charge/discharge reactions occur in a plug flow reactor containing red P powder, and the mediator species are electrochemically regenerated in the cell stack. In the present half-cell study, the auxiliary tank contained soluble redox species (biphenyl and pyrene) for charge compensation. FIG. 1B is a schematic depiction of a mediated charge reaction for phosphorus in the flow reactor. FIG. 1C is a schematic depiction of a mediated discharge reaction of $Na_{x+y}P$ in a redox flow reactor.

Mediated RFBs according to the invention offer several major advantages over other RFB technologies. Because the anion radical species can be recycled several times through the cell stack during a single charge/discharge cycle, a mediated RFB's energy density is decoupled from the redox species' solubility in the electrolyte. Furthermore, the anode's performance is unaffected by volumetric changes of P since the mediated reactions occur in the flow reactor and do not require P to be electronically wired into the cell stack. Finally, the flow reactor ensures inherently safe battery operation since an accidental short circuit through the membrane will not result in a dangerous thermal runaway scenario.

The mediated red P anode can be a $Na^+$-based mediated RFB anode which operates at a very negative potential, for example ~1.3 V more negative than $TiO_2$. The invention provides a high capacity mediated reaction, 800 mAHr/g, which is 5× to 10× higher than other reported capacities for mediated RFB systems. The invention is a conversion reaction anode with high volume expansion/contraction (~300 vol %). The non-aqueous cells utilized mediator concentrations 3 to 25× higher than other non-aqueous cells. The cell can be cycled at 2-30× higher current densities compared to other nonaqueous cells.

The charge and discharge of the anode material is mediated in a redox-flow battery configuration by using a thermodynamically stable non-passivating electrolyte which is separated from the cathode using a selective cation conducting membrane. The arene mediator with the most negative standard reduction potential is the biphenyl anion radical, Eo~0.2 V vs. Na/Na+), but this radical cannot reduce the alkali metal cations (upon charge), and it can reduce only a small fraction of the theoretical capacity of the alkali metal alloys. The invention provides a high energy anode which is enabled by the mediated charge and discharge of phosphorus (active anode material) in a redox flow configuration. The appropriate selection of mediators, electrolyte, and membrane enables the charge and discharge of the phosphorus anode material at very negative potentials and very high active material utilization. Inert conductive additives, and binders are not required. The phosphorus is not formed into a conventional electrode.

Phosphorus can be charged to form sodium phosphide ($Na_3P$) with a theoretical capacity of 2,596 mAh/$g_P$ at potentials <~1 V vs. Na/Na$^+$. Na and P are inexpensive and abundant resources which make them ideal candidates for large-scale electrochemical energy storage devices. Despite these attractive properties, the performance of P anodes has been hindered by the large volume changes of P (308% expansion when forming $Na_3P$) during battery operation. Conventional electrodes containing P, conductive additive, and binder exhibit poor cycling stability due to repeated swelling/shrinking of P which results in electronic isolation of the active material. The invention addresses this problem by the placement of the phosphorus in the external container.

Electrochemical Characterization of Organic Mediators

Figure 2A:
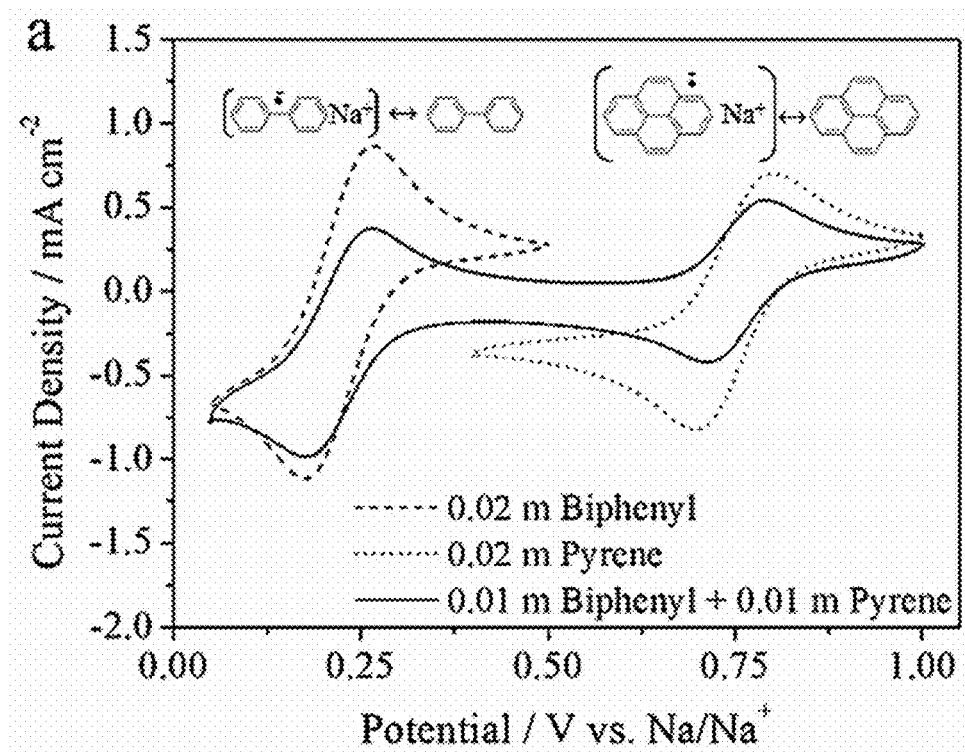
FIG. 2A shows cyclic voltammograms of electrolytes containing biphenyl and/or pyrene with 0.9 m and NaTFS in diglyme collected at a scan rate of 10 mV/s.

The fundamental redox properties of electrolytes containing biphenyl and/or pyrene dissolved with 0.9 m sodium trifluoromethanesulfonate (NaTFS) in diglyme were first investigated. FIG. 2 shows cyclic voltammograms of electrolytes containing biphenyl and/or pyrene with 0.9 m NaTFS in diglyme collected at a scan rate of 10 mV/s. As shown in FIG. 2A, the cyclic voltammograms of electrolytes containing either 0.02 m biphenyl or 0.02 m pyrene exhibited half-wave potentials ($E_{1/2}$, determined from the average of the anodic and cathodic peak positions) of 0.22 and 0.75 V vs. Na/Na$^+$, respectively. These results demonstrate that biphenyl and pyrene operate within an appropriate potential range to drive reversible Na storage in a red P anode, wherein most of the capacity is available ca. 0.1-1 V vs. Na/Na$^+$).

Figure 2B:
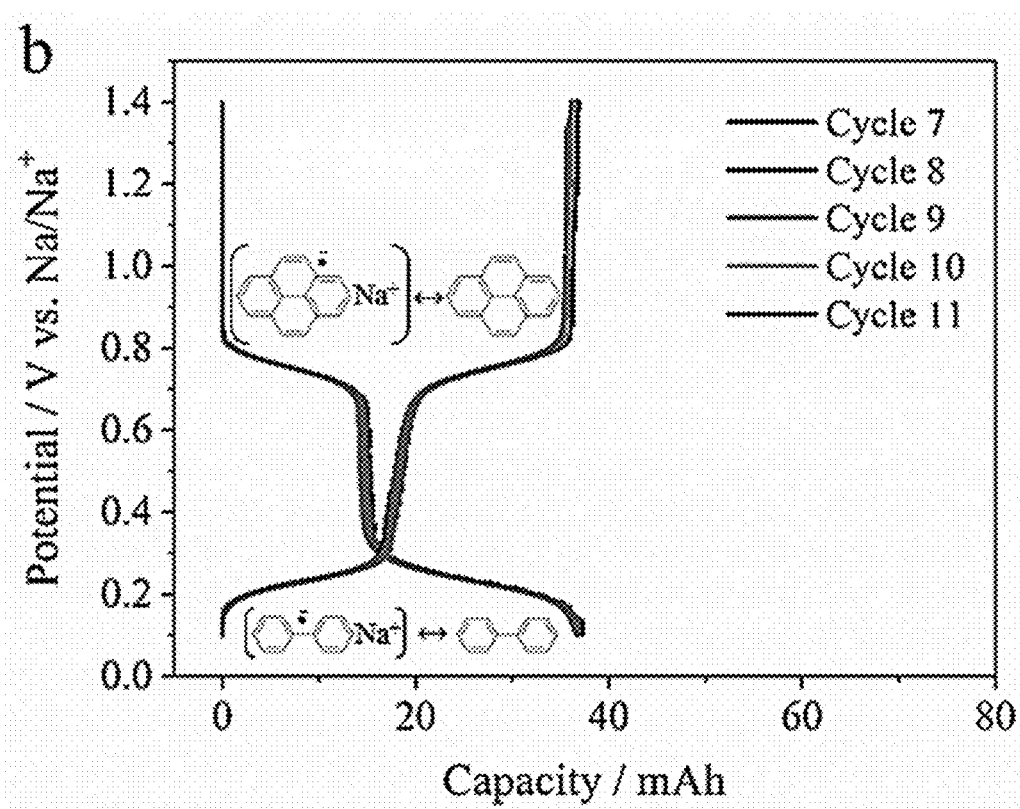
FIG. 2B shows charge/discharge curves of a redox flow cell containing biphenyl and pyrene mediators.

An electrochemical cell was created to evaluate the redox properties of biphenyl and pyrene in a flow battery configuration. The electrolyte in the working compartment contained 22 mAh of biphenyl+22 mAh of pyrene (see Table 3) and was cycled between 0.1-1.4 V vs. Na/Na$^+$ at a current of 5 mA (corresponding to 0.78 mA/cm$^2$ and a C-rate of 0.125 C). Representative charge/discharge curves are shown in FIG. 2B. The two plateaus near 0.75 and 0.23 V vs. Na/Na$^+$ during reduction correspond to formation of Na$^+\pi.^-$ and Naß.$^-$ as given by Equations 1 and 2, respectively:

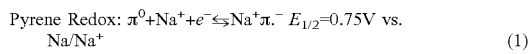

Pyrene Redox: $\pi^0+Na^++e^- \leftrightarrows Na^+\pi.^-$ $E_{1/2}$=0.75V vs. Na/Na$^+$ (1)

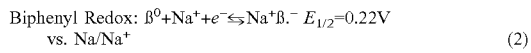

Biphenyl Redox: $ß^0+Na^++e^- \leftrightarrows Na^+ß.^-$ $E_{1/2}$=0.22V vs. Na/Na$^+$ (2)

Figure 2C:
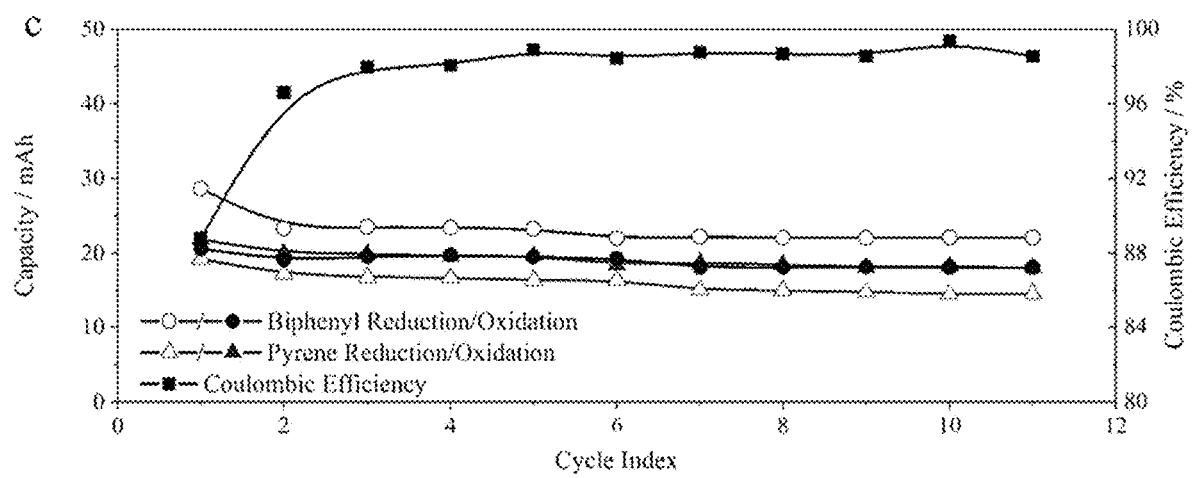
FIG. 2C shows the cycling performance of this cell wherein open/closed symbols represent reduction/oxidation capacities, respectively.

During the oxidation steps, minimal voltage hysteresis (<10 mV) was observed for both plateaus, and each species exhibited very reproducible behavior over several cycles as shown in FIG. 2C. The reduction and oxidation capacities for each plateau differed by 3-4 mAh/cycle, but the overall irreversible capacity loss was only ~0.5 mAh/cycle (corresponding to 98-99% coulombic efficiency). This irreversible capacity loss was most likely due to a side reaction involving pyrene.

Electrochemical Mediation of a Red Phosphorus Anode

To demonstrate the feasibility of the mediated RFB anode shown in FIG. 1A, red P powder (22 mg, corresponding to 57 mAh assuming formation of Na$_3$P) was added to the electrolyte in the working electrode compartment after performing the measurements shown in FIG. 2C. A small quantity of P (i.e., a theoretical capacity ratio $Q_P/Q_{ß+\pi}$~1.5) was used to establish proof-of-concept, but practical devices would contain higher P loadings to achieve high energy density. The mediated charge and discharge reactions are summarized in Equations 3 and 4:

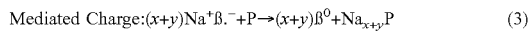

Mediated Charge: $(x+y)Na^+ß.^- + P \rightarrow (x+y)ß^0 + Na_{x+y}P$ (3)

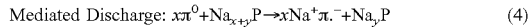

Figure 3A:
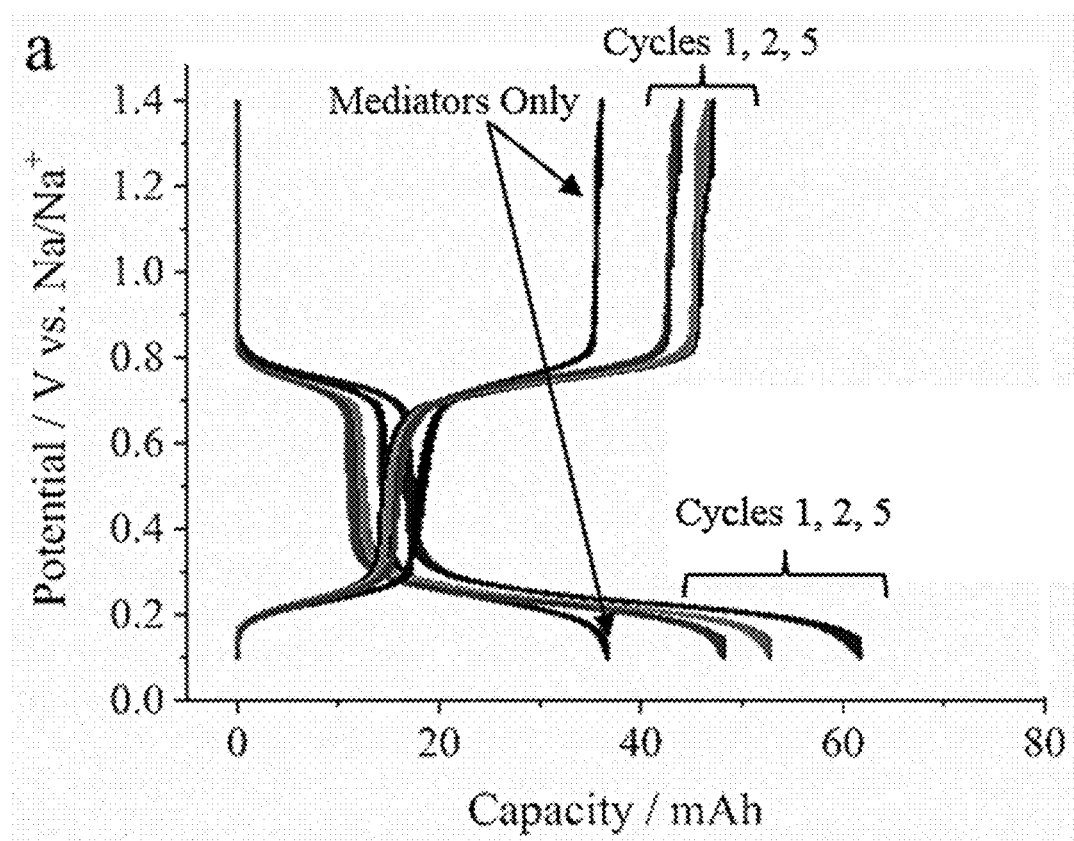
FIG. 3A shows charge/discharge curves of a flow cell containing biphenyl, pyrene, and red phosphorus powder.
Figure 3B:
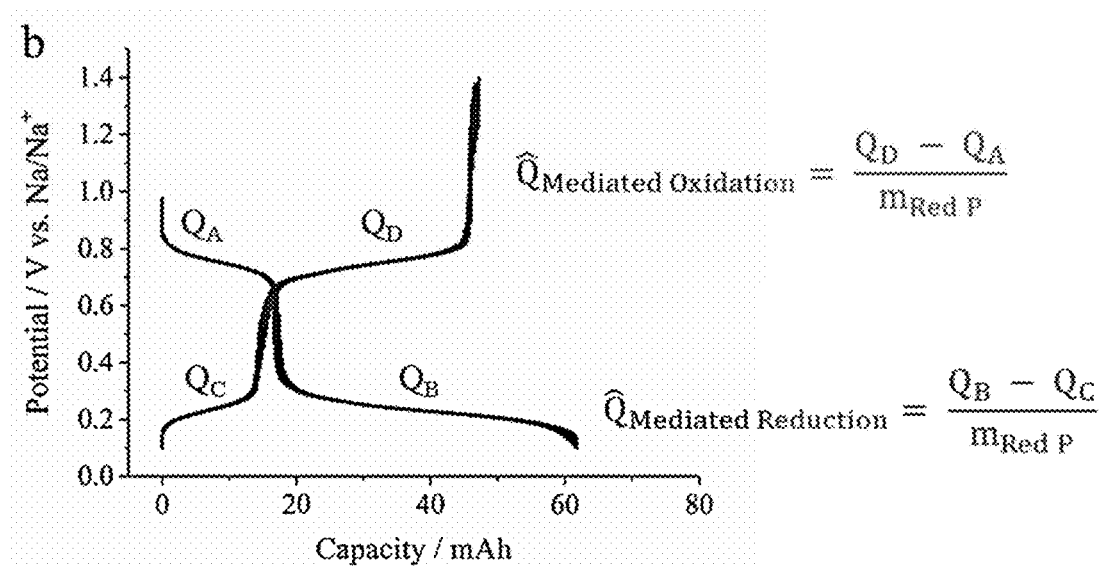
FIG. 3B shows the first cycle voltage profile and illustrates how mediated charge/discharge capacities were calculated.
Figure 3C:
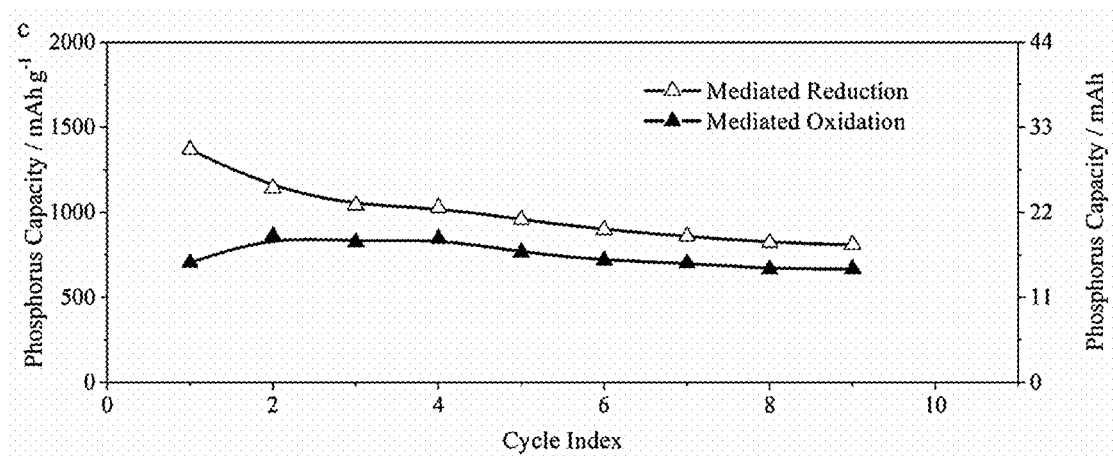
FIG. 3C shows mediated reduction/oxidation capacities of red phosphorus over 9 cycles. Experiments were conducted at a current of 5 mA, corresponding to a current density of 0.78 mA/cm$^2$ (calculated based on the membrane's active surface area).

Mediated Discharge: $x\pi^0 + Na_{x+y}P \rightarrow xNa^+\pi.^- + Na_yP$ (4)

where 0≤x+y≤3 depending on the reaction conversion. FIGS. 3A-C demonstrate the electrochemical characterization of a flow cell containing biphenyl, pyrene, and red P powder. FIG. 3A shows charge/discharge curves. FIG. 3B shows 1$^{st}$ cycle voltage profile showing the calculation of mediated charge/discharge capacities. FIG. 3C shows mediated reduction/oxidation capacities of red P over 9 cycles. Experiments were conducted at a current of 5 mA (corresponding to 0.78 mA/cm$^2$).

Figure 4:
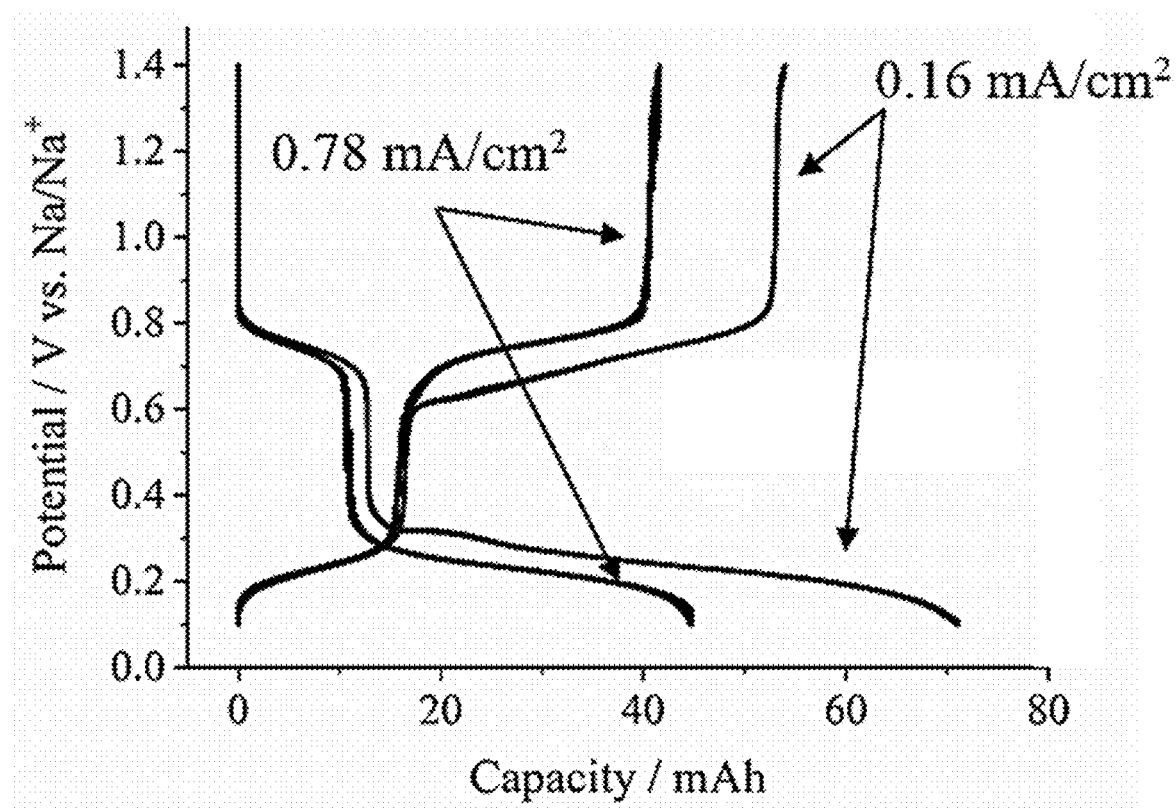
FIG. 4 shows representative charge/discharge curves collected at currents of 1 and 5 mA, corresponding to 0.16 and 0.78 mA/cm$^2$, respectively, for a redox flow cell containing biphenyl and pyrene mediators with red phosphorus powder.
Figure 5:
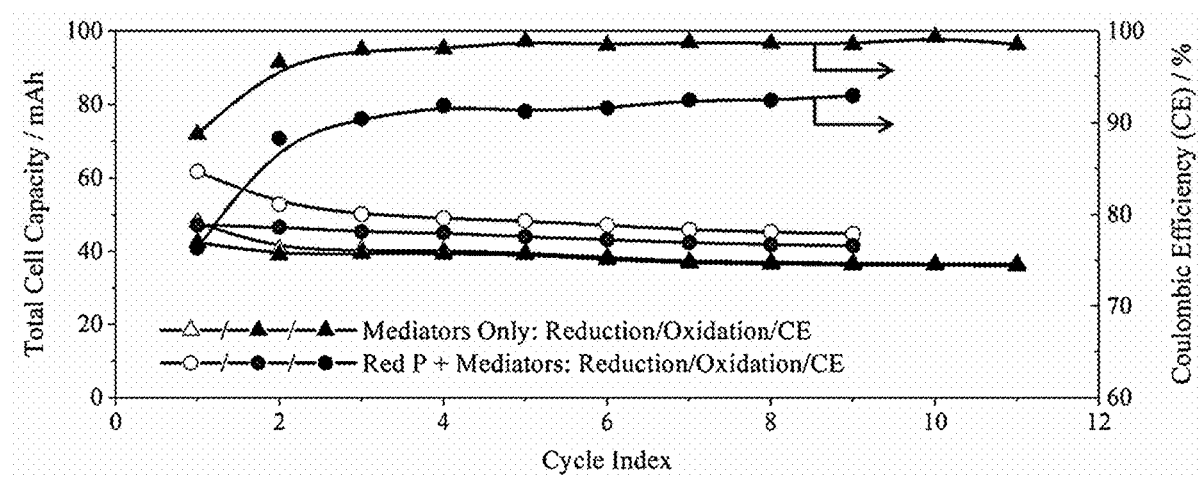
FIG. 5 summarizes the capacity and coulombic efficiency for the RFB experiments with and without red phosphorus. Experiments were conducted at a current of 5 mA, corresponding to 0.78 mA/cm$^2$. Electrolyte compositions of the working and auxiliary compartments are given in Table 3.

During galvanostatic reduction (see FIG. 3A), pyrene and biphenyl were converted from the neutral species ($\pi^0$ and $ß^0$) to the anion radical pairs (Na$^+\pi.^-$ and Na$^+ß.^-$) at ~0.75 and ~0.23 V vs. Na/Na$^+$, respectively. The Na$^+ß.^-$ subsequently reacted with red P powder to produce Na$_{x+y}$P and $ß^0$ (Equation 3). The neutral biphenyl was then circulated back to the cell stack to regenerate Na$^+ß.^-$ until the P was fully sodiated. The mediated sodiation capacity was 1,370 mAh/g$_P$ (corresponding to formation of Na$_{1.58}$P) as calculated using the method shown in FIG. 3B. During the oxidation steps, Na$^+ß.^-$ and Na$^+\pi.^-$ were oxidized to their neutral forms. $\pi^0$ subsequently desodiated the Na$_{x+y}$P to Na$_y$P (Equation 4), forming Na$^+\pi.^-$ which was recycled back to the cell stack to regenerate $\pi^0$. The capacity measured ~0.75 V vs. Na/Na$^+$ during oxidation was much greater than that which can be attributed to the pyrene content (see FIG. 3A), demonstrating that the pyrene successfully mediated the desodiation reaction. FIG. 3C shows the initial desodiation capacity was 710 mAh/g$_P$ and gradually faded to 670 mAh/g$_P$ over 9 cycles. When the current density was reduced from 0.78 to 0.16 mA/cm$^2$ (see FIG. 4, significantly higher sodiation and desodiation capacities were measured (1,900 and 1,120 mAh/g$_P$ corresponding to stoichiometries of Na$_{2.20}$P and Na$_{0.91}$P, respectively), indicating the system was limited by the reaction rate between the mediators and P powder. Despite issues with the pyrene mediator, the performance of the red P anode shown here compares well with previous reports on mediated and redox-targeted approaches for RFBs. Table 1 summarizes the performance of systems related to this topic. The invention uses an external flow reactor wherein reversible Na storage in a red P powder is mediated using soluble arene anion radicals (biphenyl and pyrene). Consequently, the energy density of the system increases with the P/mediator mass ratio. Since the mediated electrochemical reactions occur outside the cell stack, this method allows for efficient utilization of active materials which are difficult to incorporate into conventional electrodes due to large volume changes, low electronic conductivity, etc. The invention can be adapted to include either Na-based or Li-based anodes and cathodes by selecting appropriate mediators that bound the operating potential window of the active material. Ultimately, such mediated electrochemical reactions can be used to develop low-cost, high energy density RFBs.

Cyclic Voltammetry Experiments

A three electrode cell was used to collect cyclic voltammograms with electrolytes containing: (i) 0.02 m biphenyl (99.5%, Sigma-Aldrich), (ii) 0.02 m pyrene (98%, Sigma-Aldrich), and (iii) 0.01 m biphenyl+0.01 m pyrene with 0.9 m sodium trifluoromethanesulfonate (NaTFS, 98%, Sigma-Aldrich) dissolved in diglyme. Na metal (ACS reagent grade, Sigma-Aldrich) was added to the solutions such that the molar ratio of the anion radical/neutral species was 1/1. Cyclic voltammograms were collected using a Au working electrode (1.6 mm diameter, polished to 0.050 µm), Ti counter electrode (6.4 mm diameter), and Na reference electrode. The reference electrode contained Na metal submerged in a solution of 1 m NaTFS in tetraglyme (99%, Sigma-Aldrich) and was separated from the cell's electrolyte by a poly(ethylene oxide)/NaTFS/tetraglyme membrane.

Voltammograms were acquired by polarizing the working electrode between 0.05-1.50 V vs. Na/Na$^+$ at a scan rate of 10-100 mV/s using a Biologic SP-200 potentiostat. The solution resistance between the working and reference electrodes was estimated using a current interruption method in which a ~5 µA pulse current was applied for 0.05 s, and the potential response was measured. The calculated solution resistance (867±55 0 for each electrolyte) during the cyclic voltammograms was automatically compensated in the EC-Lab software. At least 5 scans were conducted with each system to ensure collection of stable and reproducible voltammograms.

Redox Flow Cell Experiments

Flow cell experiments were conducted in an Ar-filled glovebox using a custom stainless steel electrochemical cell. Ni foam electrodes (2.54×2.54 cm$^2$ footprint, 0.125-0.130 cm thick, MTI Corp) were spot welded over serpentine flow channels. A Na-ß" Al$_2$O$_3$ membrane (4.5×4.5 cm$^2$ footprint, 1.5 mm thick, Ionotec Ltd.) was placed between Celgard 2325 separator layers and butyl rubber gaskets, and the cell was torqued to 10 in-lbs. Syringe pumps were used to intermittently circulate electrolyte at 5 mL/min back-and-forth through each side of the cell via polypropylene Luer fittings and polypropylene tubing. Ultra-high purity Ar (passed through a ppb gas scrubber) flowed over the headspace of the solution reservoirs to avoid side reactions of the anion radical solutions with trace impurities (e.g., $CO_2$) in the glovebox. The electrolyte added to the working and auxiliary electrode compartments (approximately 10 and 35 mL, respectively) contained NaTFS, biphenyl, and pyrene dissolved in diglyme. Species concentrations in the electrolyte are listed in Table 3. Red P powder (98.9%, 100 mesh, Alfa-Aesar) was added directly to the working compartment for the mediated RFB tests.

TABLE 3

Species concentration in the working and auxiliary compartments for the electrochemical cells evaluated in this study.

| Cell Configuration | Species | Working Compartment | | Auxiliary Compartment | |
|---|---|---|---|---|---|
| | | Concentration (mol/ $kg_{diglyme}$) | Theoretical Capacity* (mAh) | Concentration (mol/ $kg_{diglyme}$) | Theoretical Capacity* (mAh) |
| Flow Cell | NaTFS | 0.728 | N/A | 0.372 | N/A |
| | Biphenyl | 0.0768 | 22.1 | 0.234 | 210 |
| | Pyrene | 0.0768 | 22.1 | 0.235 | 211 |

*Theoretical capacities calculated assuming a 1 $e^-$ transfer

A Biologic SP-200 potentiostat was used to perform galvanostatic charge/discharge experiments in which the working electrode was cycled between 0.10-1.4 V vs. $Na/Na^+$ at currents of 1 and 5 mA (corresponding to 0.16 and 0.78 $mA/cm^2$, respectively, based on the active surface area of the Na-ß" $Al_2O_3$ membrane). A Na reference electrode (Na metal submerged in a 1 m NaTFS/tetraglyme solution separated by a polyethylene oxide/NaTFS/tetraglyme membrane) was used to monitor the potential of the working electrode.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, and methods of operation other than those illustrated and described may be employed in accordance with the spirit of the invention, and such changes, alterations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A battery, comprising:
a redox flow anode chamber coupled to an anode current collector electrode;
a separator conducting at least one selected from the group consisting of lithium ions and sodium ions, and coupled to the anode chamber, wherein the anode chamber comprises a first redox-active mediator and a second redox-active mediator;
an external container in fluid connection with the redox flow anode chamber, the external container having therein an elemental solid phosphorus material, wherein the first redox-active mediator and the second redox-active mediator are circulated through the half-cell electrode chamber and the external container;
wherein the first redox-active mediator is an arene comprising at least one selected from the group consisting of a polyaromatic hydrocarbon, biphenyl, or a substituted derivative of either thereof, and wherein the second redox-active mediator comprises a second arene, wherein the second arene is a polyaromatic hydrocarbon, or a substituted derivative of either thereof, with the proviso that the second redox-active mediator is not the same as the first redox-active mediator;
wherein the first redox-active mediator and the second redox-active mediator are dissolved in a non-aqueous solvent, and wherein the solvent is at least one selected from the group consisting of: tetrahydro-furan, dimethoxyethane, diglyme, triglyme, tetraethyleneglycol dimethylether, and mixtures thereof;
wherein the elemental phosphorus material has an average redox potential between the redox potential of the first mediator and the redox potential of the second mediator, wherein during a charging cycle the first redox-active mediator is reduced at the current collector and subsequently reduces the phosphorus material, and wherein during a discharging cycle the second mediator is oxidized at the current collector, and the second redox-active mediator is then reduced by the reduced phosphorus material, and wherein the elemental phosphorus is mediated in a voltage range of 0.1-0.8 V vs. $Na/Na^+$.

2. The battery of claim 1, wherein the first, second, or first and second redox-active mediator is an arene that is substituted, and includes one or more substituent groups, R, wherein each R is independently selected from a linear, branched, cyclic, or aromatic alkyl group having 1-50 carbon atoms, optionally functionalized with a functional group including O, S, or N.

3. The battery of claim 2, wherein the second arene is selected from the group consisting of: biphenyl, methyl-naphthalene, naphthalene, acenaphthalyne, pyrene, anthracene, fluorene, and azulene, and substituted derivatives of any thereof, with the proviso that the second arene is not the same as the first arene.

4. The battery of claim 2, wherein the second redox-active mediator comprises a second arene, wherein the second arene is substituted or unsubstituted, with the proviso that the second arene is not the same as the first arene.

5. The battery of claim 1, wherein the active electrode in the external container is in a flow reactor configuration.

6. The battery of claim 1, wherein the battery comprises a cathode, and the cathode comprises a cathode half-cell electrode chamber coupled to a current collector electrode comprising an active cathode material.

7. The battery of claim 1, wherein the concentration of the first redox-active mediator in the solvent is from 0.1 to 2 Molar.

8. The battery of claim 1, wherein the concentration of the second redox-active mediator in the solvent is from 0.1 to 2 Molar.

9. The battery of claim 1, wherein the first redox-active mediator is biphenyl and the second redox-active mediator is pyrene.

10. A method of operating a battery, comprising the steps of: providing a redox flow anode chamber coupled to an anode current collector;
provleiding a separator conducting at least one selected from the group consisting of Li+ and Na+, and coupled to the anode chamber, wherein the chamber comprises a first redox-active mediator and a second redox-active mediator;
wherein the first redox-active mediator is an arene comprising at least one selected from the group consisting of a polyaromatic hydrocarbon, biphenyl, or a substituted derivative of either thereof, and wherein the second redox-active mediator comprises a second arene, wherein the second arene is a polyaromatic hydrocarbon, or a substituted derivative of either thereof, with the proviso that the second redox-active mediator is not the same as the first redox-active mediator;
wherein the first redox-active mediator and the second redox-active mediator are dissolved in a non-aqueous solvent, and wherein the solvent is at least one selected from the group consisting of: tetrahydro-furan, dimethoxyethane, diglyme, triglyme, tetraethyleneglycol dimethylether, and mixtures thereof;
circulating the first redox-active mediator and the second redox-active mediator through the anode half-cell electrode chamber into an external container, wherein the external container contains therein an elemental solid phosphorus material, wherein the phosphorus material has an average redox potential between the redox potential of the first mediator and the redox potential of the second mediator;
during a charging cycle, reducing the first redox-active mediator at the current collector electrode and using the reduced first redox-active mediator to reduce the phosphorus material in the external container;
during a discharge cycle, oxidizing the reduced second mediator at the current collector anode, and then reducing the second redox-active mediator with the reduced phosphorus material in the external container; and,
wherein the elemental phosphorus is mediated in a voltage range of 0.1-0.8 V vs. Na/Na$^+$.

11. The method of claim 10, wherein the capacity of the mediated reaction is from 100 to 1900 mAH/g.

12. A method of making a battery, comprising the steps of:
coupling a redox flow anode chamber to an anode current collector;
coupling to the anode half-cell electrode chamber a separator conducting at least one selected from the group consisting of Li+ and Na+;
coupling to the anode chamber an external chamber comprising an elemental solid phosphorus material;
placing into the redox flow half-cell electrode chamber a solvent containing a first redox-active mediator and a second redox active mediator, wherein the phosphorus material has an average redox potential between the redox potential of the first mediator and the redox potential of the second mediator, and the first redox-active mediator and the second redox-active mediator are selected for a redox voltage spread and operating voltage of the anode half-cell electrode chamber;
wherein the first redox-active mediator is an arene comprising at least one selected from the group consisting of a polyaromatic hydrocarbon, biphenyl, or a substituted derivative of either thereof, and wherein the second redox-active mediator comprises a second arene, wherein the second arene is a polyaromatic hydrocarbon, or a substituted derivative of either thereof, with the proviso that the second redox-active mediator is not the same as the first redox-active mediator;
wherein the first redox-active mediator and the second redox-active mediator are dissolved in a non-aqueous solvent, and wherein the solvent is at least one selected from the group consisting of: tetrahydro-furan, dimethoxyethane, diglyme, triglyme, tetraethyleneglycol dimethylether, and mixtures thereof;
coupling a cathode to the redox flow anode current collector electrode and to the separator; and,
wherein the elemental phosphorus is mediated in a voltage range of 0.1-0.8 V vs. Na/Na$^+$.

* * * * *